Aug. 8, 1961   D. E. NORGAARD   2,995,704
OHMMETERS
Filed Aug. 18, 1958

INVENTOR
D.E. NORGAARD
BY  J.C. Chapman.
ATTORNEY

United States Patent Office 2,995,704
Patented Aug. 8, 1961

2,995,704
OHMMETERS
Donald E. Norgaard, Los Altos, Calif., assignor to Hewlett-Packard Company, Palo Alto, Calif., a corporation of California
Filed Aug. 18, 1958, Ser. No. 755,602
2 Claims. (Cl. 324—62)

This invention relates to direct-reading multi-scale ohmeters.

The principal object of this invention is to provide an accurate ohmmeter having an extended range by eliminating measurements errors introduced by lead resistance when measuring low resistance values and by the shunting effect of the indicating device when measuring high resistance values.

Other and incidental objects of this invention will be apparent from a reading of this specification and an inspection of the accompanying drawing in which.

Figure 1:
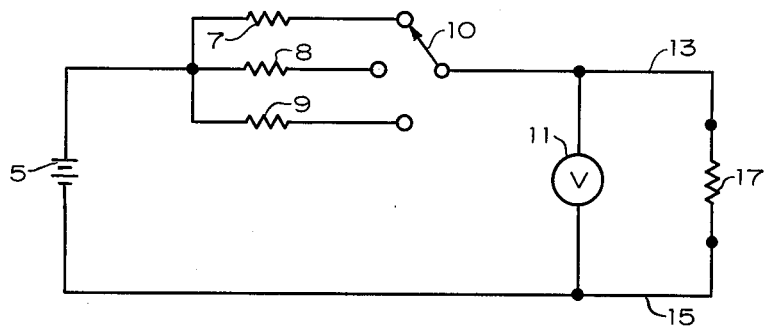
FIGURE 1 is a circuit diagram of a conventional ohmeter of the prior art.

Referring now to FIGURE 1 there is shown a conventional ohmmeter comprising a voltage source 5, a bank of calibrating resistors 7, 8, 9, a switch 10 to select one of the resistors of the bank, a voltmeter 11, and two leads 13 and 15 across which may be connected component 17, the resistance of which is to be measured.

If it be assumed that the voltage source 5 has zero internal resistance, that the voltmeter has an infinite impedance and that the leads 13 and 15 have no resistance, the voltage V indicated on the voltmeter with the switch 10 connected as shown in the drawing is:

$$V = \frac{E}{1 + \frac{R_7}{R_{17}}}$$

where E is the voltage of the source 5, $R_7$ is the resistance of the calibrating resistor 7, and $R_{17}$ is the resistance of the component 17. The voltage V is therefore a function of the resistance of the component 17 and the scale of the voltmeter 11 may be calibrated accordingly.

In practice, however, practical voltage sources having negligible internal resistance are difficult to obtain, and voltmeters having very high resistance are expensive. Also the leads 13 and 15 have a finite resistance. When the resistance of the component 17 is of the order of a fraction of an ohm for instance, the resistance of these leads may introduce a substantial error in the reading of the voltmeter 11 since the value indicated thereon is the sum of the resistance of leads 13 and 15 and of component 17. When the resistance of component 17 is high the small amount of current passed through the voltmeter 11 may become a source of substantial error.

Figure 2:
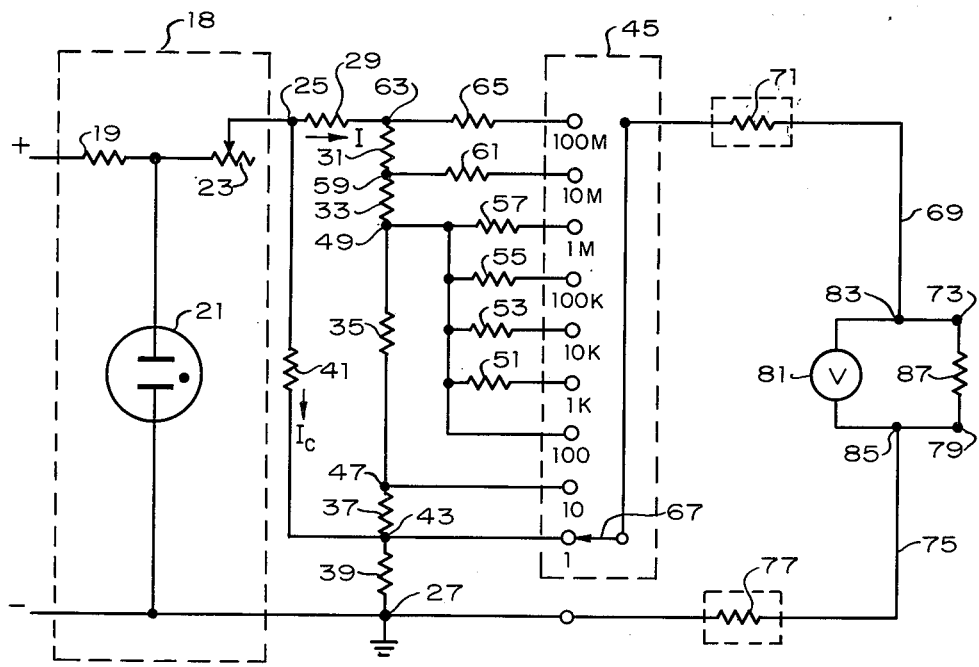
FIGURE 2 is a circuit diagram of an ohmeter in accordance with this invention.

The ohmeter of FIGURES 2 is designed to have a very wide range and to compensate for lead resistance at low ranges and for voltmeter resistance at high ranges.

Referring now to FIGURE 2, there is provided a voltage source 18 comprising a fixed resistor 19, a voltage regulating gas discharge tube 21 and an adjustable resistor 23. A suitable direct current power source is connected between points marked + and — at the left of FIGURE 2. The positive terminal 25 of the voltage source 18 is connected to its negative terminal 27 through series connected resistors 29, 31, 33, 35, 37 and 39. A resistor 41 is connected in shunt with the series combination of resistors 29, 31, 33, 35 and 37. The junction 43 of resistors 37 and 39 is directly connected to one of the terminals of a range switch 45. This terminal corresponds to the lowest resistance range of the system. The junction 47 of resistors 35 and 37 is directly connected to the next higher decade terminal of the switch 45. The junction 49 of resistors 33 and 35 is directly connected to the next higher decade terminal of the switch 45, and through resistors 51, 53, 55 and 57 to the next four higher decade terminals respectively of the switch 45. The junction 59 of resistors 31 and 33 is connected through resistor 61 to the next higher decade terminal of the switch 45, while the junction 63 of resistors 29 and 31 is connected through resistor 65 to the next higher decade terminal of the switch 45.

The switch 45 comprises a movable contact 67 which may be selectively connected to any one of the terminals of the switch 45. A lead 69 having a finite resistance schematically shown at 71 is connected between the contact 67 and the test terminal 73. Another lead 75 having a finite resistance schematically shown at 77 is connected between the negative terminal 27 of the voltage source 18 and the test terminal 79. A voltmeter 81 is connected across the terminals 83 and 85 which also comprise the test terminals 73 and 79. The component 87, the resistance of which is to be measured, is connected across the test terminals 73 and 79.

The operation of the ohmmeter of FIGURE 2 will first be explained in connection with compensation for the lead resistance 71 and 77 when the component 87 has a low resistance value. Let it be assumed, therefore, that the resistance of the component 87 is in the order of one ohm. The contact 67 is connected to the lowest terminal of the switch 45 so that the center scale reading of the voltmeter 81 indicates 1 ohm. Let it be assumed that the current I is set at exactly 10.00 milliamperes and that the sensitivity of the voltmeter 81 is exactly 10 millivolts for its full scale. The voltage drop across resistor 39 is made exactly 10.00 millivolts by the proper choice of the values of resistor 39 and of resistor 41, the resistor 41 controlling the amount of compensating current Ic flowing through resistor 39. Thus, when the component 87 is disconnected, the voltmeter 81 will read full scale indicating an infinite resistance across the two terminals 73 and 79. If the terminals 73 and 79 are short-circuited, the voltmeter 81 will read zero. If the sum of the resistances 39, 71 and 77 is made equal to the desired center scale value (i.e. 1 ohm), then when the resistance of component 87 is this value (i.e. 1 ohm) the voltmeter 81 will sense exactly 5.00 millivolts and indicate the center scale reading of 1 ohm. Thus the scale is calibrated and will indicate correctly the resistance of component 87 even though the lead resistances 71 and 77 are an appreciable fraction thereof. The foregoing assumes that the resistance of the voltmeter 81 is many times that of component 87 and can therefore be neglected.

In the above example if $R_{39}+R_{71}+R_{77}=1$ ohm (the desired center scale value for voltmeter 81) and $R_{71}+R_{77}=.05$ ohm, then $R_{39}=.950$ ohm. Thus:
$(I+I_c)R_{39}=.0100$ volt. Since $I=.0100$ ampere $$I_c = \frac{.0100 - IR_{39}}{R_{39}} = \frac{.0100}{.950} - .0100 = .525 \text{ milliampere}$$

If the voltage at terminal 25 is 125 volts then:

$$R_{41} = \frac{124.99}{5.25} \times 10^4 \text{ ohms} = 238{,}100 \text{ ohms}.$$

$R_{29}$ may be computed as follows:
$I(R_{29}+R_{31}+R_{33}+R_{35}+R_{37})=124.99$ or $$R_{29} = \frac{124.99 - I(R_{31}+R_{33}+R_{35}+R_{37})}{I}$$

$$= \frac{124.99}{I} - (R_{31}+R_{33}+R_{35}+R_{37})$$

Since $I=.01$ ampere, $R_{29}=12,499-(R_{31}+R_{33}+R_{35}+R_{37})$ ohms. If the voltage across the gas discharge tube 21 is 150 volts, then the value of resistor 23 must be:

$$R_{23}=\frac{150.0-125.0}{10.525\times 10^{-3}}=2375 \text{ ohms}$$

The variable resistor 23 is simply adjusted so that the voltmeter 81 reads full scale when the component 87 is disconnected. This adjustment is provided in order to adjust for individual variations in the characteristics of tube 21. Once adjusted correctly $R_{23}$ need not be changed as long as the voltage across tube 21 remains constant.

The compensation provided for the lead resistances 71 and 77 at the lowest range of the switch 45 is also effective in the other ranges. Thus when the contact 67 is placed at the 10 ohms terminal the same scale markings of the voltmeter 81 apply to the next decade provided the resistance of resistor 37 is exactly 9.00 ohms and the full scale voltage sensitivity of the voltmeter 81 is .100 volt. The same is true when the contact 67 is placed at the 100 ohms terminal provided the resistance of resistor 35 is exactly 90 ohms and the full scale sensitivity of the voltmeter 81 is 1.00 volts.

A slight error is introduced since the current I when the test terminals 73 and 79 are open-circuited differs from the current I when the test terminals 73 and 79 are short circuited. This difference is due to the difference in resistance from junction 49 to terminal 27 under these different conditions. This error, however, cannot exceed the value of $$\frac{100}{R_{23}+R_{29}+100}=\frac{1}{147.68}=.68\%$$

from short circuit ($R_{87}=0$) to open circuit ($R_{87}=\infty$) when the contact 67 is at the 100 ohms terminal. The maximum error is approximately .068% when the contact 67 is at the 10 ohms position and .0068% when the contact 67 is at the 1 ohm position.

Keeping the sensitivity of the voltmeter 81 at 1.00 volt full scale, a multiplying factor of 1000 is obtained when contact 67 is at the 1000 ohms position if resistor 51 has a value of 900 ohms. Additional decade steps are obtained when resistor 53 has a value of 9900 ohms, resistor 55 has a value of 99,900 ohms and resistor 57 has a value of 999,900 ohms provided of course that the shunt resistance of the voltmeter 81 is very much greater than 1 megohm. If this resistance is 200 megohms ±1% the shunting error due to the presence of the voltmeter 81 is only .5% when the contact 67 is at the 1 megohm terminal.

When the contact 67 is at the 10 megohms position the sensitivity of the voltmeter 81 is kept at 1.00 volt full scale with a voltmeter resistance of 200 megohms. The current drawn by the voltmeter 81 causes a voltage drop across resistor 61. Compensation is effected by adding the voltage drop across resistor 33 to the voltage at the junction 49.

When the test terminals 73 and 79 are open circuited a voltage of exactly 1.00 volt with an effective internal impedance of 10 megohms should appear when switch 45 is set to the 10M position. Since the voltmeter resistance of 200 megohms always shunts the test terminals 73 and 79 the value of the resistor 61 may be computed as follows:

$$\frac{R_{61}\times R_{81}}{R_{61}+R_{v}}=10.00 \text{ megohms or } \frac{R_{61}\times 200\times 10^{6}}{R_{61}+(200\times 10^{6})}=10.00$$

megohms or $R_{61}=10.525$ megohms.

Since a current of $$\frac{1}{200}10^{-6}$$

amperes flows through resistor 61 when the voltage across the voltmeter 81 is 1.00 volt, the voltage across resistor 61 is:

$$E_{61}=\frac{1}{2}\times 10^{-8}\times R_{61}$$

$$=.5\times 10^{-8}\times 10.525\times 10^{-6}=.051125 \text{ volt}$$

Thus the voltage at point 59 should be:

$$E_{59}=1.00+E_{61}=1.051125 \text{ volt}$$

To obtain this voltage the resistance of resistor 33 should be:

$$R_{33}=\frac{E_{59}}{I}=\frac{.051125}{.0100}=5.1125 \text{ ohms}$$

The same principle is applied to the next decade step when the contact 67 is at the 100 megohms terminal. When $R_{65}$ is 200 megohms the voltage as junction 63 is 2.00 volts, and the resistance 31 is 94.8875 ohms when $I=10,00$ milliamperes. The foregoing neglects the value of the string of series resistors 31, 33, 35, 37 and 39 since their total value of approximately 200 ohms contributes a negligible error.

An additional step of one decade (to give a center scale resistance reading of 100 megohms) cannot be obtained without increasing the resistance of the voltmeter 81 to a value greater than 1000 megohms. However, extending the range of the ohmmeter downwards is not restricted.

An ohmmeter of this invention can provide accurate readings in a range from .02 ohm to 5000 megohms. It can easily be built into a direct current vacuum tube voltmeter and milliammeter since most of the components of the ohmmeter are used in the voltmeter and milliammeter.

I claim:

1. A direct-reading multi-range ohmmeter designed to measure the resistance of a component having a low resistance, said ohmmeter comprising: a series-circuit comprising first and second calibrating resistors, a pair of test terminals across which said component is to be connected, a voltmeter connected in shunt with said test terminals, connecting means having a finite resistance and including a range switch to connect said test terminals across said first calibrating resistor when said range switch is in its lower range and across said series-circuit when said range switch is in its higher range, first circuit means including said second calibrating resistor to pass a known current through said first calibrating resistor, and second circuit means to pass an additional compensating current through said first calibrating resistor, said second circuit means being connected in parallel with said first circuit means, said additional current being of such magnitude as to cause a voltage drop across said first calibrating resistor which compensates for the voltage drop caused by the resistance of said connecting means.

2. A direc-reading multi-range ohmmeter designed to measure selectively the resistance of components having low and high resistances, said ohmmeter comprising: a series-circuit comprising first and second calibrating resistors, a pair of test terminals across which said component is to be connected, a voltmeter connected in shunt with said test terminals, said voltmeter having a finite resistance and a full-scale deflection of V volts, connecting means having a finite resistance and including a range switch to connect said test terminals across said first calibrating resistor when said range switch is in its lower range and across the series-circuit comprising said first and second calibrating resistors when said range switch is in its next higher range, first circuit means including said second calibrating resistor to pass a known current through said first calibrating resistor, second circuit means to pass an additional compensating current through said first calibrating resistor, said second circuit means being connected in parallel with said first circuit means, said additional current being of such magnitude as to cause a voltage drop across said first calibrating resistor which compensates for the voltage drop caused by the resistance of said connecting means, means including said range switch to connect a third calibrating resistor in series with said connecting means when said range-switch is in a higher range, means to apply to said third calibrating resistor a voltage greater than the full-scale value of said voltmeter to compensate for the voltage drop across said third calibrating resistor due to the current through said voltmeter, said last named means comprising a fourth resistor in series with said first and second calibrating resistors.

References Cited in the file of this patent

UNITED STATES PATENTS

| | | |
|---|---|---|
| 1,593,024 | Macadie | July 20, 1926 |
| 2,659,862 | Branson | Nov. 17, 1953 |

OTHER REFERENCES

Hogg: "Design of Simple Ohmmeters," Wireless World, August 1943, pages 224–227.

Bailey: "Ohmmeter Reads to 300 Megohms," Radio Electronics, April 1949, pages 55–56.